United States Patent [19]

Tanabe et al.

[11] Patent Number: 5,916,832
[45] Date of Patent: Jun. 29, 1999

[54] HERMETIC SEALING COMPOSITION

[75] Inventors: Ryuichi Tanabe; Hiroshi Usui; Tsuneo Manabe, all of Yokohama; Yuichi Kuroki, Funabashi, all of Japan

[73] Assignee: Asahi Glass Company Ltd., Tokyo, Japan

[21] Appl. No.: 08/986,325

[22] Filed: Dec. 5, 1997

[30] Foreign Application Priority Data

Oct. 14, 1997 [JP] Japan .................................. 9-280904

[51] Int. Cl.$^6$ ........................................ C03C 8/24
[52] U.S. Cl. .................. 501/17; 501/17; 501/76
[58] Field of Search .................. 501/15, 17, 76

[56] References Cited

U.S. PATENT DOCUMENTS

| | | | |
|---|---|---|---|
| 4,405,722 | 9/1983 | Kokubu et al. | 501/15 |
| 4,589,899 | 5/1986 | Hudecek | 501/15 |
| 5,202,292 | 4/1993 | Tanabe et al. | |
| 5,264,272 | 11/1993 | Tanabe et al. | |
| 5,281,561 | 1/1994 | Dumesnil et al. | 501/76 |
| 5,470,804 | 11/1995 | Morena | 501/15 |
| 5,612,261 | 3/1997 | Lim et al. | 501/15 |
| 5,683,948 | 11/1997 | Tanabe et al. | |
| 5,700,744 | 12/1997 | Park et al. | 501/15 |
| 5,714,840 | 2/1998 | Tanabe et al. | 313/581 |
| 5,733,828 | 3/1998 | Usui et al. | 501/17 |

FOREIGN PATENT DOCUMENTS

| | | |
|---|---|---|
| 34-3443 | 2/1956 | Japan . |
| 35-1381 | 2/1956 | Japan . |
| 36-17821 | 3/1958 | Japan . |
| 48-35681 | 10/1973 | Japan . |
| 53-125419 | 11/1978 | Japan . |
| 55-20264 | 2/1980 | Japan . |
| 57-13507 | 3/1982 | Japan . |
| 61-43298 | 9/1986 | Japan . |
| 61-43299 | 9/1986 | Japan . |
| 2-157139 | 6/1990 | Japan . |
| 2-180730 | 7/1990 | Japan . |
| 7-330374 | 12/1995 | Japan . |

*Primary Examiner*—Karl Group
*Attorney, Agent, or Firm*—Oblon, Spivak, McClelland, Maier & Neustadt, P.C.

[57] ABSTRACT

A hermetic sealing composition consisting essentially of from 90 to 99.95 wt % of a crystalline low melting glass powder and from 0.05 to 10 wt % of a low expansion ceramic filler powder, and having an average thermal expansion coefficient after firing of from $80 \times 10^{-7}$ to $110 \times 10^{-7}$/°C. within a range of from room temperature to 300° C., wherein the crystalline low melting glass consists essentially of:

| | |
|---|---|
| PbO | 71.5 to 78.0 wt % |
| ZnO | 10.5 to 14.5 wt % |
| $B_2O_3$ | 7.0 to 10.0 wt % |
| $SiO_2$ | 1.65 to 3.0 wt % |
| BaO | 0.1 to 1.95 wt % |
| SrO | 0 to 1.5 wt % |
| CaO | 0 to 1.5 wt % |
| BaO + SrO + CaO | 0.5 to 1.95 wt %, | and contains substantially no fluorine, and the weight ratio of ZnO/PbO is within a range of from 0.14 to 0.20.

16 Claims, No Drawings

HERMETIC SEALING COMPOSITION

BACKGROUND OF THE INVENTION

1. Field of the Invention

The present invention relates to a hermetic sealing composition which is capable of hermetically sealing a panel and a funnel of a color cathode ray tube by heat treatment at a low temperature in a short time, whereby in the subsequent heating and exhausting step, the temperature raising rate can be made sufficiently high.

2. Discussion of Background

Heretofore, for hermetically sealing a panel and a funnel of a color cathode ray tube, it has been common to employ a crystalline low melting glass of $PbO-B_2O_3-ZnO-SiO_2$ type and to carry out hermetic sealing by maintaining it at a temperature of from 440 to 450° C. for from 30 to 40 minutes. The interior of the panel and the funnel thus hermetically sealed, is exhausted under vacuum higher than $10^{-6}$ Torr while being heated at a temperature of from 300 to 380° C.

Such a crystalline low melting glass of $PbO-B_2O_3-ZnO-SiO_2$ type is disclosed, for example, in JP-B-34-3443, JP-B-35-1381, JP-B-36-17821, JP-A-48-35681 and JP-A-2-157139. However, the glass of the type thus disclosed has a problem that the crystallization is slow, and it takes time for hermetic sealing.

If it takes long time for hermetic sealing, the phosphors in the color cathode ray tube are likely to be deteriorated by heat. Further, due to heating for a long period of time, the panel and the funnel are likely to undergo heat shrinkage, and their dimensions may slightly change, such being undesirable.

To increase the crystallization rate, JP-B-57-13507, JP-A-53-125419 and JP-A-55-20264 propose to incorporate fluorine to the low melting glass. However, it has been found that fluorine should not be incorporated to the glass, since it is likely to gasified in the subsequent heating and exhausting step to adversely affect the electron gun.

Further, JP-B-61-43298, JP-B-61-43299 and JP-A-7-330374 disclose that a glass containing no fluorine and having a relatively high content of PbO is used, whereby hermetical sealing can be accomplished in short time.

The hermetic sealing composition disclosed in JP-A-7-330374 is capable of hermetically sealing a panel and a funnel of a cathode ray tube in a very short period of time as compared with conventional compositions and thus may be regarded as essentially good material. However, as a result of a further research by the present inventors, it has been found that a cathode ray tube hermetically sealed by means of the sealing composition has a problem that if the temperature raising rate is made high in the exhausting step, it is likely to break during the temperature rise, and accordingly, it is not possible to increase the temperature raising rate so much.

SUMMARY OF THE INVENTION

It is an object of the present invention to solve such a problem and to provide a hermetic sealing composition which is capable of hermetically sealing a panel and a funnel of a color cathode ray tube in short time and which, at the same time, makes it possible to increase the temperature raising rate sufficiently high in the subsequent heating and exhausting step.

The present invention provides a hermetic sealing composition consisting essentially of from 90 to 99.95 wt % of a crystalline low melting glass powder and from 0.05 to 10 wt % of a low expansion ceramic filler powder, and having an average thermal expansion coefficient after firing of from $80 \times 10^{-7}$ to $110 \times 10^{-7}$/°C. within a range of from room temperature to 300° C., wherein the crystalline low melting glass consists essentially of:

| | |
|---|---|
| PbO | 71.5 to 78.0 wt % |
| ZnO | 10.5 to 14.5 wt % |
| $B_2O_3$ | 7.0 to 10.0 wt % |
| $SiO_2$ | 1.65 to 3.0 wt % |
| BaO | 0.1 to 1.95 wt % |
| SrO | 0 to 1.5 wt % |
| CaO | 0 to 1.5 wt % |
| BaO + SrO + CaO | 0.5 to 1.95 wt %, | and contains substantially no fluorine, and the weight ratio of ZnO/PbO is within a range of from 0.14 to 0.20.

DETAILED DESCRIPTION OF THE PREFERRED EMBODIMENTS

In the present invention, the crystalline glass is one which shows a heat generation peak in a differential thermal analysis in which it is maintained at a sealing temperature (from 400 to 450° C.) for 2 hours. The low melting glass is a glass having a softening point of not higher than 600° C. The low expansion ceramic filler is a ceramic filler having a thermal expansion coefficient of not higher than $70 \times 10^{-7}$/°C.

With the composition of the present invention, a panel and a funnel of a color cathode ray tube can be hermetically sealed by maintaining it at a temperature of from 400 to 450° C. for a short period of time of from 5 to 15 minutes, and it is free from flowing, foaming or deterioration of the mechanical strength, by heating during the exhaust at a temperature of from 300 to 380° C. after bonding. Further, the temperature raising rate during the exhaust can be made sufficiently high.

Hereafter, "%" means "wt %" unless otherwise specified. In the present invention, the content of the crystalline low melting glass powder in the hermetic sealing composition is within a range of from 90 to 99.95%. If the content exceeds 99.95%, the amount of the low expansion ceramic filler tends to be small, whereby the thermal expansion coefficient tends to be too large, and the average thermal expansion coefficient tends to be different from that of the panel and the funnel, thus leading to breakage. If the content is less than 90%, the glass content tends to be small, whereby the fluidity will be poor, and air tightness of the sealed portion is likely to be impaired. The content is preferably from 93 to 99.9%.

On the other hand, the content of the low expansion ceramic filler powder is within a range of from 0.05 to 10 wt % in the total amount. If the content exceeds 10% in the total amount, the fluidity during sealing tends to be poor. If the content is less than 0.05% in the total amount, it tends to be difficult to bring the average thermal expansion coefficient to be consistent with the panel glass, and the strength tends to be poor. The content is preferably from 0.1 to 7%.

Now, the composition of the crystalline low melting glass to be used for the hermetic sealing composition of the present invention will be described.

If the content of PbO is less than 71.5%, the softening point tends to be too high, and the fluidity tends to be poor, and the strength and air tightness of the sealed portion are likely to be impaired. The content is preferably at least 74.5%. If the content exceeds 78.0%, the softening point tends to be too low, and the temperature raising rate during the exhaust may not be made sufficiently high. The content is preferably at most 77.0%, more preferably at most 76.0%.

If the content of ZnO is less than 10.5%, the softening point tends to be too high, and crystallization tends to be difficult. It is preferably at least 11.5%, more preferably at least 12.1%. Further, if it exceeds 14.5%, devitrification is likely to occur during melting of the glass. It is preferably at most 13.5%.

The weight ratio of ZnO/PbO is an important parameter to satisfy both hermetic sealing in a short time and a high temperature raising rate during the exhaust. If the weight ratio is less than 0.14, the ratio of PbO to ZnO is too high, and the temperature raising rate during the exhaust can not be made sufficiently high. It is preferably at least 0.15. On the other hand, if the ratio exceeds 0.20, the glass tends to hardly flow, and the bulb pressure strength tends to be low. Further, crystallization tends to be difficult, and it tends to be difficult to complete the hermetic sealing in short time. Preferably, it is at most 0.18.

If the content of $B_2O_3$ is less than 7.0%, the softening point tends to be too high, and the fluidity tends to be poor. Preferably, it is at least 8.0%. On the other hand, if it exceeds 10.0%, the chemical durability tends to be poor. It is preferably at most 9.5%.

The content of $SiO_2$ is very important in order to increase the temperature raising rate during the exhaust within the range of the glass composition of the present invention. If this content is less than 1.65%, crystallization tends to be too quick, whereby the temperature raising rate during the exhaust can not be made sufficiently high. Preferably, it is at least 1.70%. In the vicinity of the upper limit within the allowable content range, the properties may not so drastically change as in the vicinity of the lower limit. However, if it exceeds 3.0%, the softening point tends to be too high, and the fluidity tends to be poor. Preferably, it is at most 2.5%.

BaO is also an important parameter to satisfy both the hermetic sealing in short time and the high temperature raising rate during the exhaust. By defining it within the above range, both of the above properties can be satisfied for the first time. If the content is less than 0.1%, the adhesion of the hermetic sealing composition to the panel and the funnel tends to be inadequate, and the temperature raising rate during the exhaust can not be made high. Preferably, it is at least 0.6%. On the other hand, if it exceeds 1.95%, the crystallization speed of glass tends to be low, and sealing can not be carried out in short time, and the bulb pressure strength tends to be low. Preferably, it is at most 1.90%. To carry out the sealing as quickly as possible, BaO is preferably at most 1.5%. On the other hand, in order to lower the viscosity of the glass during melting of glass to facilitate the production, BaO is preferably more than 1.5%, more preferably at least 1.55%.

CaO and SrO are not essential, but they may, respectively, be incorporated to improve the melting property of glass. However, if they exceed 1.5%, respectively, the crystallization speed of glass tends to be low.

Further, with a view to improving adhesion, BaO, CaO and SrO are required to be at least 0.5%, preferably at least 0.6%, in their total amount. On the other hand, in order not to decrease the crystallization speed of glass, their total amount is usually at most 1.95%, preferably at most 1.90%. To carry out the sealing as quickly as possible, their total amount is preferably at least 1.5%. On the other hand, in order to lower the viscosity of glass during melting of glass to facilitate the production, their total amount is preferably more than 1.5%, more preferably at least 1.55%.

The crystalline low melting glass to be used for the hermetic sealing composition of the present invention, contains substantially no fluorine. Namely, fluorine is contained no more than the amount inevitably included as an impurity. It is thereby possible to prevent an adverse effect to the electron gun. If fluorine is contained, it is also likely that the temperature raising rate during the exhaust can not be made high.

As the low expansion ceramic filler to be used for the hermetic sealing composition of the present invention, zircon, cordierite, alumina, mullite, lead titanate, silica, β-eucryptite, β-spodumene or β-quartz solid solution is preferred from the viewpoint of handling efficiency. These fillers may be used alone or in combination as a mixture of two or more of them. It is particularly preferred to use zircon as the low expansion ceramic filler, since the sealing strength will thereby be high.

In the present invention, the average thermal expansion coefficient of the hermetic sealing composition after firing is within a range of from $80 \times 10^{-7}$ to $110 \times 10^{-7}/°C$. within a range of from room temperature to 300° C. If the average thermal expansion coefficient is outside this range, a tensile stress is likely to be unduly exerted to the panel glass, the funnel glass or the sealed portion, and the strength against pressure tends to be low. Preferably, it is within a range of from $85 \times 10^{-7}$ to $105 \times 10^{-7}/°C.$, more preferably from $90 \times 10^{-7}$ to $100 \times 10^{-7}/°C.$ Now, the present invention will be described in further detail with reference to Examples. However, it should be understood that the present invention is by no means restricted to such specific Examples.

EXAMPLES 1 to 24

In a usual manner, starting materials were prepared, mixed, and melted and vitrified at a temperature of from 1,000 to 1,200° C. Then, the glass thereby obtained was granulated into flakes by water granulation or by passing through rollers. Then, the flakes were pulverized in a ball mill for a predetermined period of time to obtain a crystalline low melting glass powder as identified in the column for "Glass composition" in the Table. Then, this crystalline low melting glass powder and a low expansion ceramic filler powder were mixed in the weight ratio as identified in the column for "Composition" in the Table, to obtain a hermetic sealing composition. In the Table, Examples 1 to 16 are Working Examples of the present invention, and Examples 17 to 24 are Comparative Examples.

With respect to this hermetic sealing composition, the flow button diameter, the mismatch at room temperature, and the average thermal expansion coefficient were measured, and the results are also shown in the Table. Further, this hermetic sealing composition was interposed between an funnel and a panel of model 25 and maintained at a temperature of from 430 to 450° C. for 10 minutes to seal the funnel and the panel to obtain a bulb. With respect to this bulb, the bulb pressure strength, the heat resisting strength and the maximum temperature raising rate for exhaust were measured, and the results and the time required for sealing to provide adequate properties, are shown in the Table. The respective measuring methods are as follows.

Flow button diameter:

The flow button diameter represents the fluidity of the composition at the time of hermetic sealing. 10 g of a sample powder of the hermetic sealing composition was press-molded into a cylindrical shape having a diameter of 12.7 mm and then maintained at a firing temperature as identified in the Table (unit: °C.) for 10 minutes, whereby the diameter (unit: mm) of the fluidized hermetic sealing composition was taken as the flow button diameter. This flow button diameter is desired to be at least 26.5 mm.

Mismatch at room temperature:

The hermetic sealing composition and a vehicle (a solution having 1.2% of nitrocellulose dissolved in isoamyl acetate) were mixed in a weight ratio of 11.5:1 to obtain a paste. This paste was coated on a funnel glass specimen and fired under the same condition as in the case for the flow button diameter. Then, the mismatch (unit: nm/cm) formed between the funnel glass specimen and the hermetic sealing composition was measured by means of a polarimeter. Symbol "+" shows that the hermetic sealing composition has a compressive strain, and symbol "−" shows that the hermetic sealing composition has a tensile strain. This mismatch is desired to be within a range of from −100 to +500 nm/cm.

Average thermal expansion coefficient:

The hermetic sealing composition was fired under the same condition as in the case for measuring the flow button diameter and then polished to a predetermined size, and the elongation was measured by a thermal expansion measuring apparatus under a condition of a temperature raising rate of 10° C./min, whereby the average thermal expansion coefficient (unit: $\times 10^{-7}$/°C.) was calculated within a range of from room temperature to 300° C. Taking matching of the thermal expansion characteristic with the glass of a cathode ray tube into consideration, this average thermal expansion coefficient is desired to be within a range of from $80\times10^{-7}$ to $110\times10^{-7}$/°C.

Bulb pressure strength:

A pressure difference between the inside and outside of the bulb was exerted by water, whereby the pressure difference at breakage was measured (unit: kg/cm$^2$, an average value of five samples) to ensure the strength as a bulb, this strength is usually desired to be at least 3 kg/cm$^2$.

Heat resisting strength:

A temperature difference was imparted between the inside and outside of the bulb, and the temperature difference at breakage was measured (unit: °C., and an average value of five samples). Taking the thermal stress by heat generation during the heat treatment step for production of a cathode ray tube into consideration, this heat resisting strength is usually desired to be at least 45° C.

Maximum temperature raising rate for exhaust:

This is the critical temperature raising rate (°C./min) at which the bulb remains unbroken as the temperature raising rate is increased in the step of exhaust the bulb. Specifically, using a bulb of model 29, the maximum temperature raising rate was measured, while exhaust the bulb to $10^{-6}$ Torr.

From the Table, it is evident that with the hermetic sealing compositions of the present invention, sealing can be accomplished in a short period of time, and the bulb pressure strength is high, and the maximum temperature raising rate for exhaust is sufficiently high.

On the other hand, Example 17 represents a case where the glass content is little, whereby the time required for sealing is long, and the maximum temperature raising rate for exhaust is inadequate, and Example 19 represents a case where the amount of SiO$_2$ is little, whereby the maximum temperature raising rate for exhaust is inadequate. Further, Example 18 represents a case where BaO is too much, whereby sealing can not quickly be carried out. Example 20 represents a case where BaO is not contained, whereby the bulb pressure strength is inadequate. Example 21 is a case where the weight ratio of ZnO/PbO is large, whereby by sealing in a short period of time, the bulb pressure strength and the maximum temperature raising rate for exhaust are inadequate. Example 22 represents a case where fluorine is contained, whereby the maximum temperature raising rate for exhaust is inadequate. Example 23 represents a case where the weight ratio of ZnO/PbO is small, whereby the maximum temperature raising rate for exhaust is inadequate, and Example 24 represents a case where BaO is not contained, whereby the maximum temperature raising rate for exhaust is inadequate.

TABLE

| | | | 1 | 2 | 3 | 4 | 5 |
|---|---|---|---|---|---|---|---|
| | | (wt %) | | | | | |
| Glass composition (wt %) | | PbO | 76.1 | 75.7 | 76.0 | 76.1 | 75.8 |
| | | ZnO | 12.7 | 12.6 | 12.2 | 12.5 | 11.9 |
| | | B$_2$O$_3$ | 8.5 | 8.6 | 8.8 | 8.7 | 9.2 |
| | | SiO$_2$ | 2.1 | 2.2 | 2.0 | 2.0 | 2.0 |
| | | BaO | 0.6 | 1.0 | 1.0 | 0.8 | 1.1 |
| | | SrO | | | | | |
| | | CaO | | | | | |
| | | ZnO/PbO (wt ratio) | 0.167 | 0.166 | 0.161 | 0.164 | 0.157 |
| Sealing composition (wt %) | Glass (wt %) | | 99.0 | 99.2 | 99.5 | 99.4 | 99.7 |
| | Filler | Zircon | 0.1 | 0.8 | 0.5 | 0.6 | |
| | | Cordierite | 0.9 | | | | 0.1 |
| | | Alumina | | | | | 0.1 |
| | | Mullite | | | | | 0.1 |
| | | Lead titanate | | | | | |
| | | Silica | | | | | |
| | | β-Eucryptite | | | | | |
| | | β-Spodumene | | | | | |
| | | β-Quartz solid solution | | | | | |
| Firing Temperature (°C.) | | | 440 | 440 | 440 | 440 | 430 |
| Flow button diameter (mm) | | | 27.5 | 27.0 | 27.1 | 27.6 | 27.1 |
| Mismatch (nm/cm) | | | +70 | +10 | +30 | +60 | +100 |
| Average thermal expansion coefficient ($\times 10^{-7}$/°C.) | | | 96 | 98 | 98 | 97 | 95 |
| Bulb pressure strength (kg/cm$^2$) | | | 3.9 | 4.3 | 4.1 | 4.4 | 4.0 |
| Heat resisting strength (°C.) | | | 50 | 52 | 51 | 46 | 52 |
| Maximum temperature raising rate for exhaust (°C./min) | | | >15 | >15 | >15 | >15 | >15 |
| Time required for adequate sealing (min) | | | 10 | 10 | 10 | 10 | 10 |
| | | | 6 | 7 | 8 | 9 | 10 |
| | | (wt %) | | | | | |
| Glass composition (wt %) | | PbO | 75.0 | 75.9 | 76.4 | 76.6 | 76.7 |
| | | ZnO | 13.1 | 11.9 | 11.7 | 11.5 | 12.3 |
| | | B$_2$O$_3$ | 8.2 | 9.2 | 8.9 | 8.9 | 8.8 |
| | | SiO$_2$ | 2.5 | 2.0 | 2.0 | 2.0 | 1.7 |
| | | BaO | 0.2 | 1.0 | 1.0 | 1.0 | 0.5 |
| | | SrO | 0.5 | | | | |
| | | CaO | 0.5 | | | | |
| | | ZnO/PbO (wt ratio) | 0.175 | 0.157 | 0.158 | 0.150 | 1.160 |
| Sealing composition (wt %) | Glass (wt %) | | 92.4 | 99.8 | 99.5 | 99.4 | 99.0 |
| | Filler | Zircon | | 0.2 | 0.5 | 0.5 | 0.5 |
| | | Cordierite | | | | | |
| | | Alumina | | | | | 0.5 |
| | | Mullite | | | | | |
| | | Lead titanate | 6.0 | | | | |
| | | Silica | 1.0 | | | | |
| | | β-Eucryptite | 0.2 | | | | |
| | | β-Spodumene | 0.2 | | | | |
| | | β-Quartz solid solution | 0.2 | | | | |
| Firing Temperature (°C.) | | | 450 | 440 | 440 | 440 | 440 |
| Flow button diameter (mm) | | | 26.6 | 27.2 | 26.8 | 27.1 | 27.1 |
| Mismatch (nm/cm) | | | +350 | +20 | +50 | +30 | +85 |
| Average thermal expansion | | | 82 | 98 | 98 | 98 | 96 |

TABLE-continued

|  |  | | | | | |
|---|---|---|---|---|---|---|
| coefficient (× 10⁻⁷/°C.) | | | | | | |
| Bulb pressure strength (kg/cm²) | | 3.6 | 4.4 | 4.1 | 4.3 | 3.9 |
| Heat resisting strength (°C.) | | 46 | 50 | 51 | 50 | 52 |
| Maximum temperature raising rate for exhaust (°C./min) | | >15 | >15 | >15 | >15 | >15 |
| Time required for adequate sealing (min) | | 10 | 10 | 10 | 10 | 10 |

|  |  | 11 | 12 | 13 | 14 | 15 |
|---|---|---|---|---|---|---|
|  |  | (wt %) | | | | |
| Glass composition (wt %) | PbO | 77.0 | 75.8 | 75.3 | 75.2 | 75.6 |
|  | ZnO | 11.7 | 11.9 | 12.1 | 11.8 | 11.9 |
|  | B₂O₃ | 8.7 | 8.7 | 8.9 | 9.0 | 8.8 |
|  | SiO₂ | 1.9 | 2.0 | 1.8 | 2.1 | 1.8 |
|  | BaO | 0.7 | 1.6 | 1.9 | 1.7 | 1.9 |
|  | SrO |  |  |  | 0.1 |  |
|  | CaO |  |  |  | 0.1 |  |
|  | F |  |  |  |  |  |
|  | ZnO/PbO (wt ratio) | 0.152 | 0.157 | 0.161 | 0.157 | 0.157 |
| Sealing composition (wt %) | Glass (wt %) | 99.6 | 99.3 | 99.4 | 96.0 | 99.6 |
| | Filler Zircon | 0.3 | 0.5 | 0.2 |  | 0.4 |
| | Cordierite |  | 0.2 |  | 1.0 |  |
| | Alumina | 0.1 |  |  | 1.0 |  |
| | Mullite |  |  |  | 0.5 |  |
| | Lead titanate |  |  |  | 0.5 |  |
| | Silica |  |  | 0.1 | 1.0 |  |
| | β-Eucryptite |  |  | 0.1 |  |  |
| | β-Spodumene |  |  | 0.1 |  |  |
| | β-Quartz solid solution |  |  | 0.1 |  |  |
| Firing Temperature (°C.) | | 440 | 440 | 440 | 440 | 450 |
| Flow button diameter (mm) | | 27.2 | 27.2 | 27.1 | 27.5 | 27.3 |
| Mismatch (nm/cm) | | −50 | +60 | +10 | +100 | +70 |
| Average thermal expansion coefficient (× 10⁻⁷/°C.) | | 103 | 97 | 98 | 95 | 96 |
| Bulb pressure strength (kg/cm²) | | 3.9 | 4.3 | 4.0 | 3.6 | 4.0 |
| Heat resisting strength (°C.) | | 50 | 52 | 50 | 46 | 50 |
| Maximum temperature raising rate for exhaust (°C./min) | | >15 | >15 | >15 | >15 | >15 |
| Time required for adequate sealing (min) | | 10 | 10 | 10 | 10 | 10 |

|  |  | 16 | 17 | 18 | 19 | 20 |
|---|---|---|---|---|---|---|
|  |  | (wt %) | | | | |
| Glass composition (wt %) | PbO | 75.4 | 75.2 | 75.2 | 76.9 | 76.5 |
|  | ZnO | 12.0 | 11.0 | 12.0 | 12.3 | 12.6 |
|  | B₂O₃ | 9.1 | 10.0 | 8.8 | 8.8 | 8.9 |
|  | SiO₂ | 1.7 | 2.3 | 2.0 | 1.5 | 2.0 |
|  | BaO | 1.8 | 1.5 | 2.0 | 0.5 |  |
|  | SrO |  |  |  |  |  |
|  | CaO |  |  |  |  |  |
|  | F |  |  |  |  |  |
|  | ZnO/PbO (wt ratio) | 0.159 | 0.146 | 0.160 | 0.160 | 0.165 |
| Sealing composition (wt %) | Glass (wt %) | 99.7 | 80.0 | 99.5 | 98.0 | 99.7 |
| | Filler Zircon | 0.3 |  | 0.5 | 1.0 | 0.3 |
| | Cordierite |  |  |  |  |  |
| | Alumina |  |  |  | 0.5 |  |
| | Mullite |  |  |  | 0.5 |  |
| | Lead titanate |  |  |  |  |  |
| | Silica |  |  |  |  |  |
| | β-Eucryptite |  | 10.0 |  |  |  |
| | β-Spodumene |  | 10.0 |  |  |  |
| | β-Quartz solid solution |  |  |  |  |  |
| Firing Temperature (°C.) | | 440 | 440 | 440 | 440 | 440 |
| Flow button diameter (mm) | | 27.0 | 21.0 | 27.0 | 27.5 | 26.0 |
| Mismatch (nm/cm) | | +60 | +410 | −120 | +60 | +90 |
| Average thermal expansion coefficient (× 10⁻⁷/°C.) | | 97 | 75 | 105 | 97 | 96 |
| Bulb pressure strength (kg/cm²) | | 4.1 | 1.9 | 1.6 | 3.2 | 2.5 |
| Heat resisting strength (°C.) | | 51 | 25 | 25 | 50 | 35 |
| Maximum temperature raising rate for exhaust (°C./min) | | >15 | <5 | 6 | 12 | 6 |
| Time required for adequate sealing (min) | | 10 | 30 | 35 | 10 | 10 |

|  |  | 21 | 22 | 23 | 24 |
|---|---|---|---|---|---|
|  |  | (wt %) | | | |
| Glass composition (wt %) | PbO | 73.0 | 74.9 | 77.9 | 76.1 |
|  | ZnO | 15.0 | 12.0 | 10.1 | 11.9 |
|  | B₂O₃ | 8.8 | 8.8 | 8.8 | 9.9 |
|  | SiO₂ | 2.0 | 2.0 | 2.1 | 1.0 |
|  | BaO | 1.2 | 2.0 | 1.1 |  |
|  | SrO |  |  |  | 1.0 |
|  | CaO |  |  |  |  |
|  | F |  | 0.3 |  |  |
|  | ZnO/PbO (wt ratio) | 0.205 | 0.160 | 0.130 | 0.156 |
| Sealing composition (wt %) | Glass (wt %) | 97.4 | 99.5 | 98.5 | 98.5 |
| | Filler Zircon | 0.1 | 0.5 | 0.5 |  |
| | Cordierite |  |  | 1.0 |  |
| | Alumina | 2.5 |  |  |  |
| | Mullite |  |  |  | 0.5 |
| | Lead titanate |  |  |  | 1.0 |
| | Silica |  |  |  |  |
| | β-Eucryptite |  |  |  |  |
| | β-Spodumene |  |  |  |  |
| | β-Quartz solid solution |  |  |  |  |
| Firing Temperature (°C.) | | 440 | 440 | 440 | 440 |
| Flow button diameter (mm) | | 23.0 | 25.0 | 28.0 | 27.2 |
| Mismatch (nm/cm) | | +160 | +30 | −80 | +50 |
| Average thermal expansion coefficient (× 10⁻⁷/°C.) | | 90 | 98 | 103 | 97 |
| Bulb pressure strength (kg/cm²) | | 2.0 | 2.6 | 3.1 | 3.2 |
| Heat resisting strength (°C.) | | 27 | 30 | 40 | 39 |
| Maximum temperature raising rate for exhaust (°C./min) | | 7 | 7 | 6 | 6 |
| Time required for adequate sealing (min) | | 10 | 10 | 10 | 10 |

As described in the foregoing, with the hermetic sealing composition of the present invention, a panel and a funnel can be hermetically sealed in a short period of time, whereby the productivity can be substantially improved. Further, with the sealed bulb, the maximum temperature raising rate for exhaust can be made sufficiently high.

What is claimed is:

1. A hermetic sealing composition consisting essentially of from 90 to 99.95 wt % of a crystalline low melting glass powder and from 0.05 to 10 wt % of a low expansion ceramic filler powder, and having an average thermal expansion coefficient after firing of from $80 \times 10^{-7}$ to $110 \times 10^{-7}$/°C. within a range of from room temperature to 300° C., wherein the crystalline low melting glass consists essentially of:

| PbO | 71.5 to 78.0 wt % |
|---|---|
| ZnO | 10.5 to 14.5 wt % |
| B₂O₃ | 7.0 to 10.0 wt % |
| SiO₂ | 1.65 to 3.0 wt % |
| BaO | 0.1 to 1.80 wt % |
| SrO | 0 to 1.5 wt % |
| CaO | 0 to 1.5 wt % |
| BaO + SrO + CaO | 0.5 to 1.80 wt %, | and wherein a weight ratio of ZnO/PbO is within a range of from 0.14 to 0.20.

2. The hermetic sealing composition of claim 1, wherein the low expansion ceramic filler is at least one selected from the group consisting of zircon, cordierite, alumina, mullite, lead titanate, silica, β-eucryptite, β-spodumene, and β-quartz solid solution.

3. The hermetic sealing composition of claim 1, wherein the crystalline low melting glass powder has a softening point of not higher than 600° C.

4. The hermetic sealing composition of claim 1, wherein the low expansion ceramic filler powder has a thermal expansion coefficient of not higher than $70 \times 10^{-7}/°C$.

5. The hermetic sealing composition of claim 1, wherein the low expansion ceramic filler is present in an amount of from 0.1 to 7 wt %.

6. The hermetic sealing composition of claim 1, wherein said PbO is present in said crystalline low melting glass in an amount of 74.5 to 77.0 wt %.

7. The hermetic sealing composition of claim 1, wherein said ZnO is present in said crystalline low melting glass in an amount of 11.5 to 13.5 wt %.

8. The hermetic sealing composition of claim 1, wherein said $B_2O_3$ is present in said crystalline low melting glass in an amount of 8.0 to 9.5 wt %.

9. The hermetic sealing composition of claim 1, wherein said $SiO_2$ is present in said crystalline low melting glass in an amount of 1.70 to 2.5 wt %.

10. The hermetic sealing composition of claim 1, wherein said BaO is present in said crystalline low melting glass in an amount of 0.6 to 1.80 wt %.

11. The hermetic sealing composition of claim 1, wherein said which has an average thermal expansion coefficient after firing or from $85 \times 10^{-7}$ to $105 \times 10^{-7}/°C$. within a range of from room temperature to 300° C.

12. The hermetic sealing composition of claim 1, wherein said ratio of ZnO/PbO is from 0.15 to 0.18.

13. A hermetic sealing composition, consisting essentially of from 90 to 99.95 wt % of a crystalline low melting glass powder and from 0.05 to 10 wt % of a low expansion ceramic filler powder, and having an average thermal expansion coefficient after firing of from $80 \times 10^{-7}$ to $110 \times 10^{-7}/°C$. within a range of from room temperature to 300° C., wherein the crystalline low melting glass consists essentially of:

| | |
|---|---|
| PbO | 71.5 to 78.0 wt % |
| ZnO | 10.5 to 14.5 wt % |
| $B_2O_3$ | 7.0 to 10.0 wt % |
| $SiO_2$ | 1.65 to 3.0 wt % |
| BaO | more than 1.5 to 1.80 wt % |
| SrO | 0 to 1.5 wt % |
| CaO | 0 to 1.5 wt % |
| BaO + SrO + CaO | more than 1.5 to 1.80 wt %, | and wherein a weight ratio of ZnOPbO is within a range of from 0.14 to 0.20.

14. The hermetic sealing composition of claim 13, wherein the low expansion ceramic filler is at least one member selected from the group consisting of zircon, cordierite, alumina, mullite, lead titanate, silica, β-eucryptite, β-spodumene and β-quartz solid solution.

15. A hermetic sealing composition, consisting essentially of from 90 to 99.95 wt % of a crystalline low melting glass powder and from 0.05 to 10 wt % of a low expansion ceramic filler powder, and having an average thermal expansion coefficient after firing of from $80 \times 10^{-7}$ to $110 \times 10^{-7}/°C$. within a range of from room temperature to 300° C., wherein the crystalline low melting glass consists essentially of:

| | |
|---|---|
| PbO | 74.5 to 77.0 wt % |
| ZnO | 11.5 to 13.5 wt % |
| $B_2O_3$ | 8.0 to 9.5 wt % |
| $SiO_2$ | 1.70 to 2.5 wt % |
| BaO | 0.6 to 1.80 wt % |
| SrO | 0 to 1.5 wt % |
| CaO | 0 to 1.5 wt % |
| BaO + SrO + CaO | 0.6 to 1.80 wt %, | and wherein a weight ratio of ZnO/PbO is within a range of from 0.15 to 0.18.

16. The hermetic sealing composition of claim 15, wherein the low expansion ceramic filler is at least one member selected from the group consisting of zircon, cordierite, alumina, mullite, lead titanate, silica, β-eucryptite, β-spodumene and β-quartz solid solution.

\* \* \* \* \*